B. BOWERS & O. H. FRANKLIN.
COTTON SEED CULLER.
APPLICATION FILED OCT. 11, 1909.
991,418.
Patented May 2, 1911.
5 SHEETS—SHEET 3.
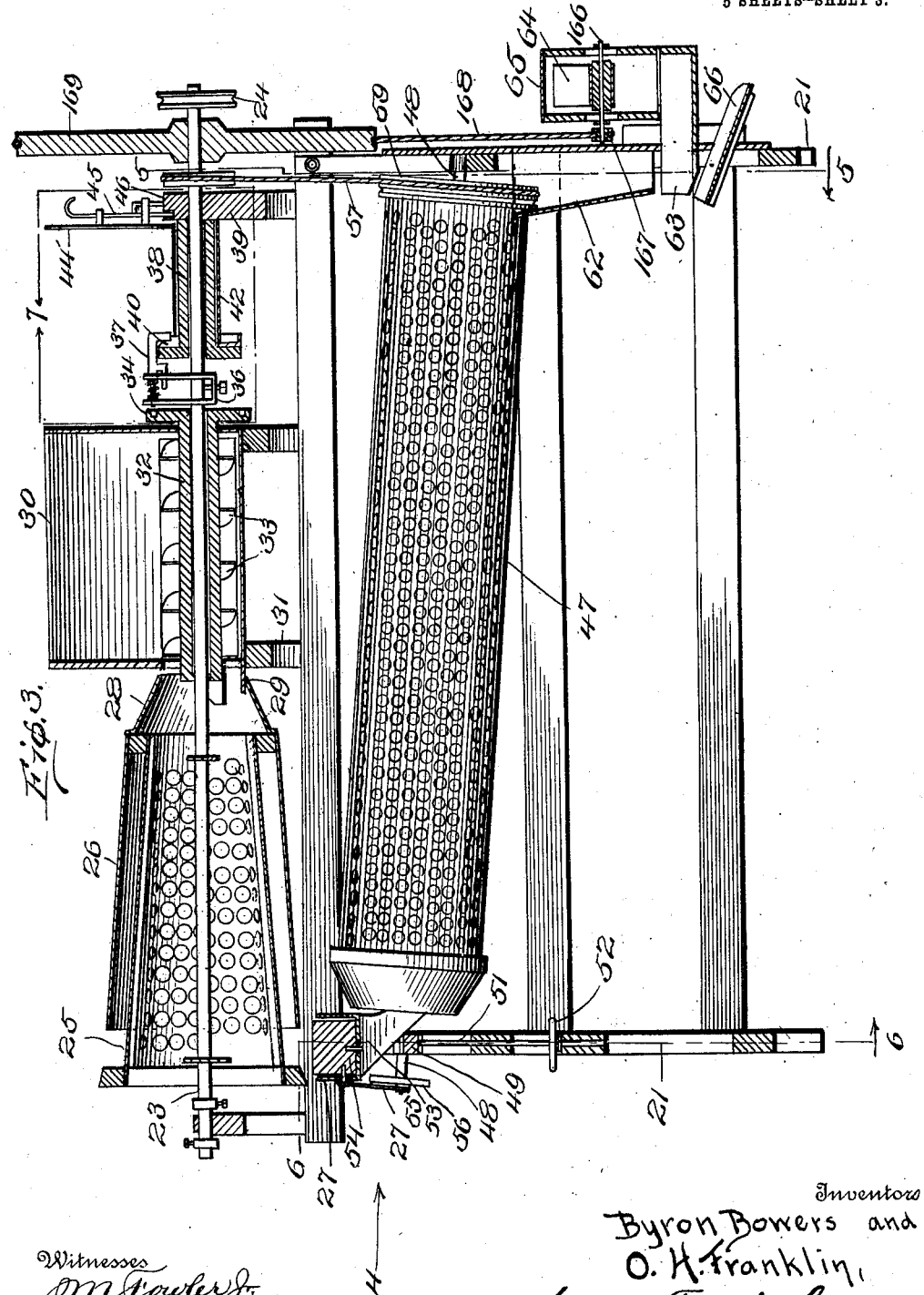
Witnesses
P. M. Fowler Jr.
L. Cloud Newman.
Inventors
Byron Bowers and
O. H. Franklin,
By Mason Fenwick Lawrence,
Attorneys

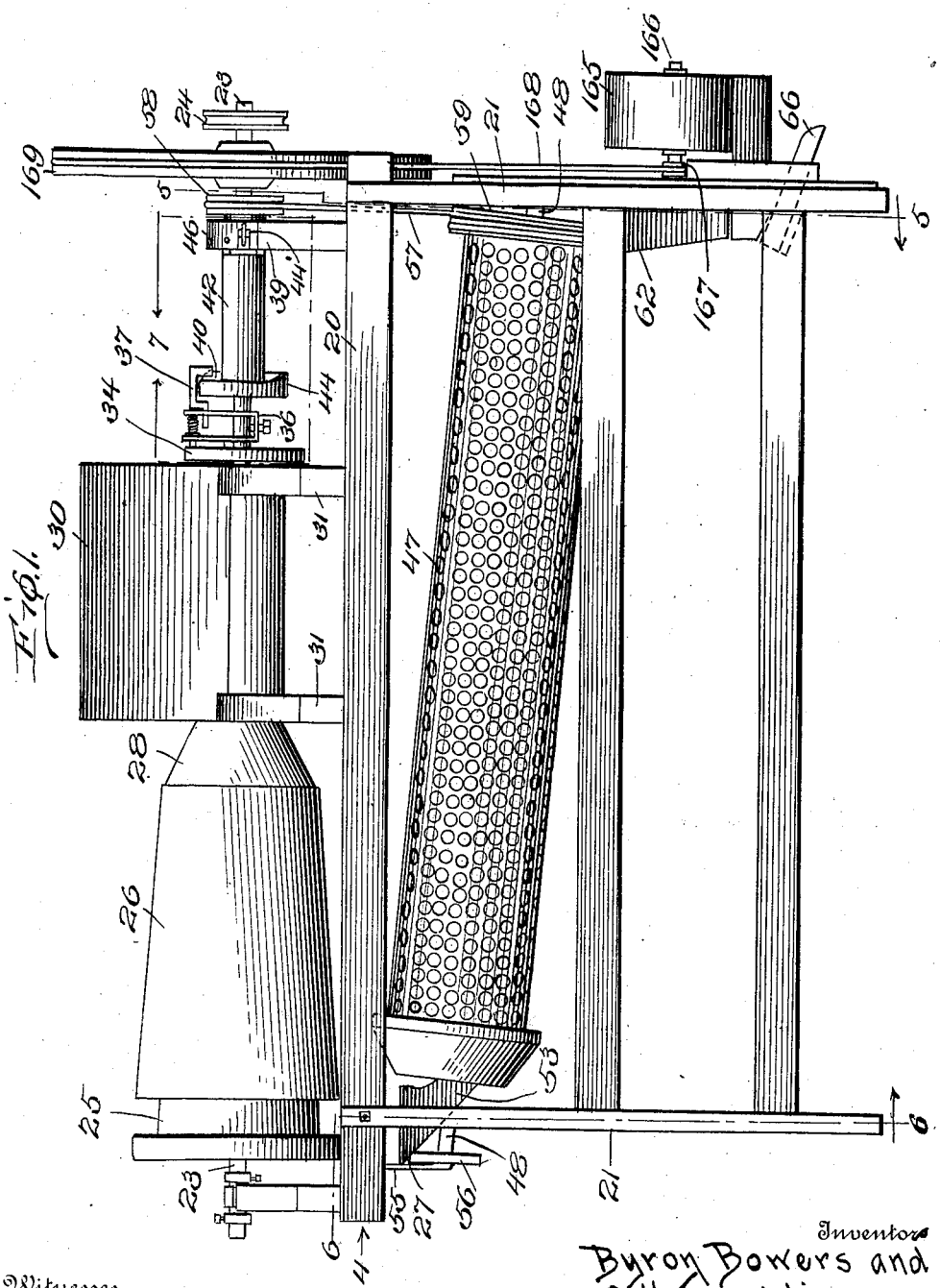

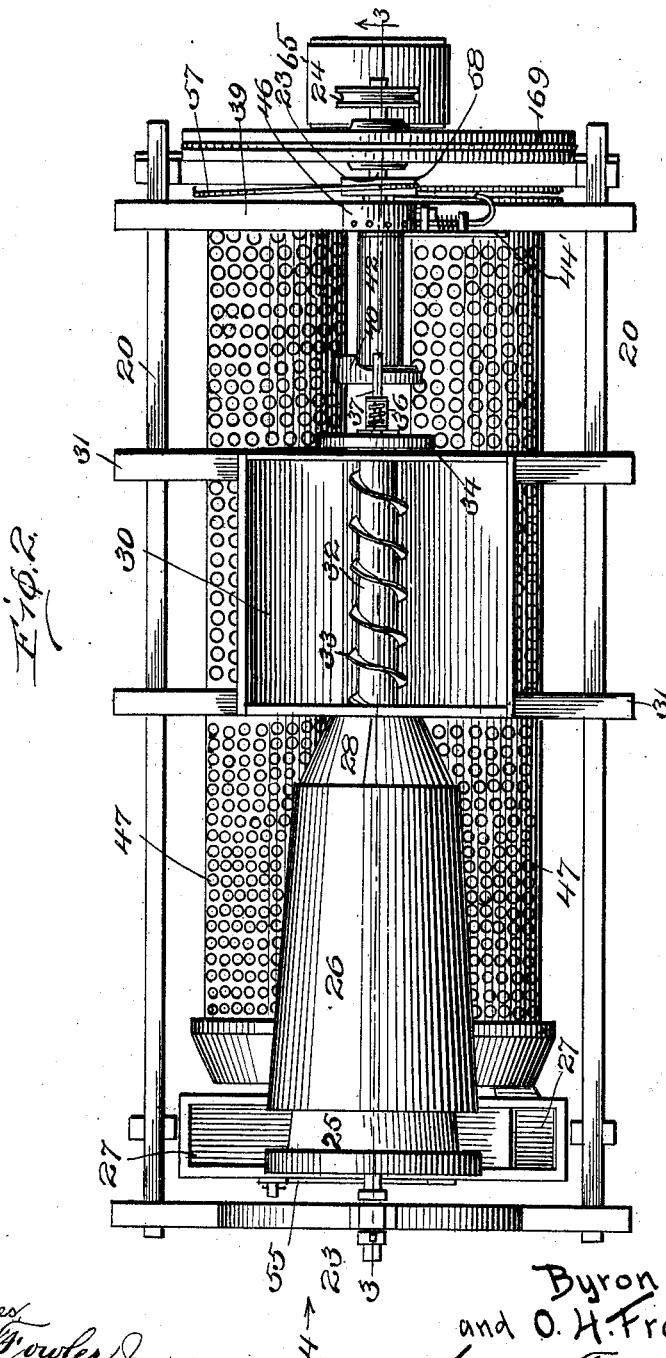

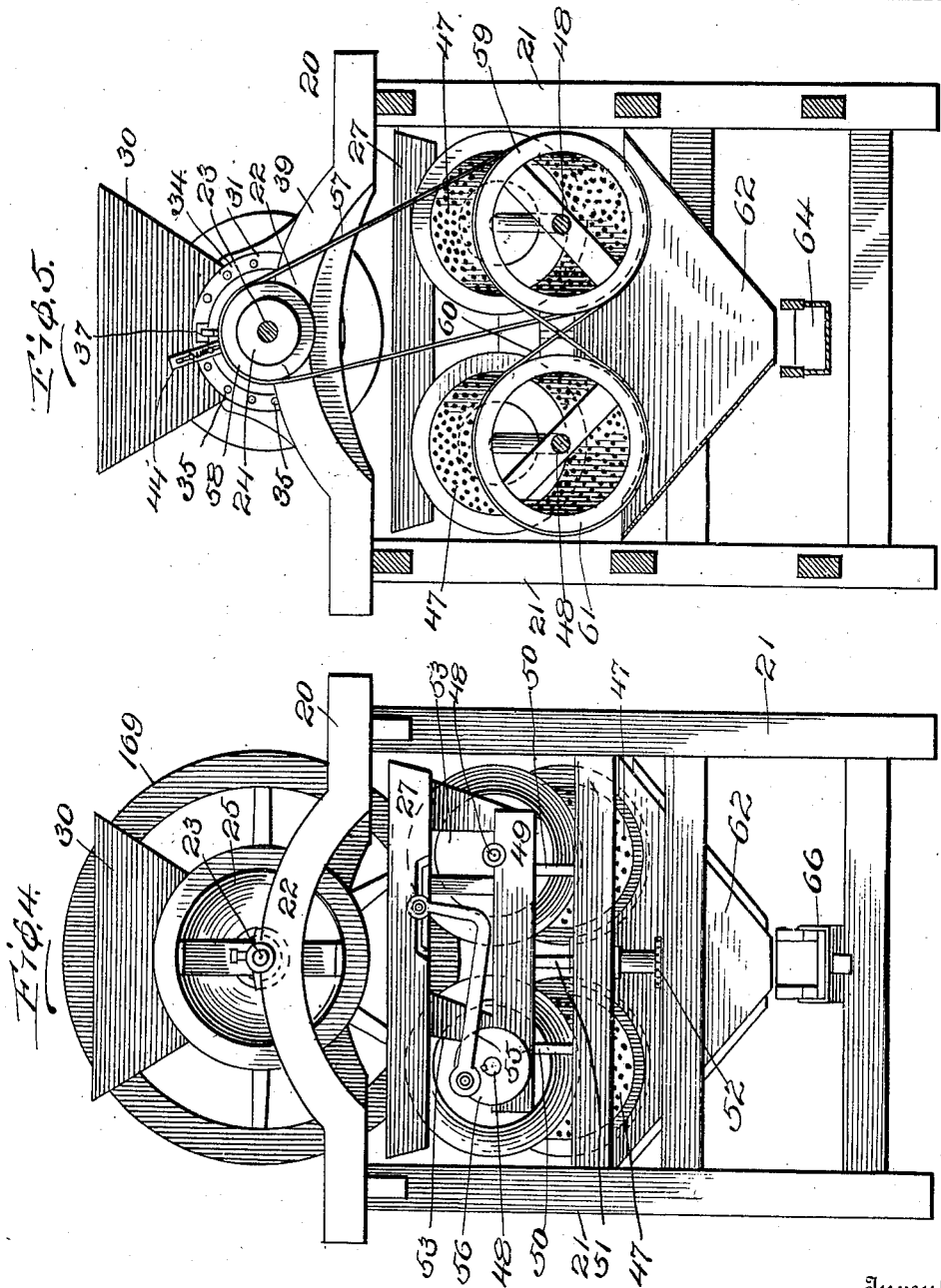

B. BOWERS & O. H. FRANKLIN.
COTTON SEED CULLER.
APPLICATION FILED OCT. 11, 1909.
991,418.
Patented May 2, 1911.
5 SHEETS—SHEET 5.
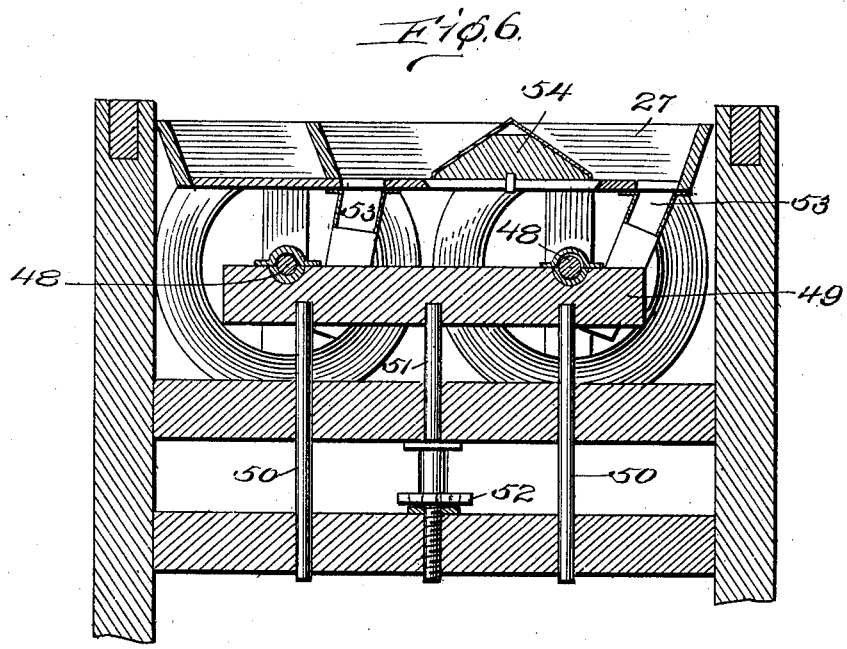

UNITED STATES PATENT OFFICE.

BYRON BOWERS AND OLIVER H. FRANKLIN, OF CANON, GEORGIA, ASSIGNORS TO COTTON SEED AND COTTON IMPROVEMENT ASSOCIATION, OF BIRMINGHAM, ALABAMA, A CORPORATION OF ARIZONA TERRITORY.

COTTON-SEED CULLER.

991,418.        Specification of Letters Patent.        Patented May 2, 1911.

Application filed October 11, 1909. Serial No. 522,039.

*To all whom it may concern:*

Be it known that we, BYRON BOWERS and OLIVER H. FRANKLIN, citizens of the United States, residing at Canon, in the county of Franklin and State of Georgia, have invented certain new and useful Improvements in Cotton-Seed Cullers; and we do hereby declare the following to be a full, clear, and exact description of the invention, such as will enable others skilled in the art to which it appertains to make and use the same.

This invention relates to cotton seed cullers, and has for an object to provide a mechanism for culling cotton seed to remove not only the sticks, stones and other foreign matter, but also to remove light, small and undeveloped seeds.

A further object of the invention is to provide in a cotton seed culler means for discharging cotton seed intermittently into a rotary screen or grader adapted to permit the cotton seed to pass through but to prevent the passage of foreign matter larger than the seed, to deliver the seed into other rotary screens provided with perforations of such extent as to permit small dirt and foreign matter, together with small undeveloped cotton seeds to pass through, to deposit the seed which does not pass through the screen in front of an air blast to throw out the full sized but light seed and to conduct the remaining or perfect seed to a spout as desired.

A further object of the invention is to provide means for intermittently discharging the seed into the first rotary screen and to further discharge the seed from such first screen alternately into the latter screens.

With these and other objects in view, the invention comprises certain novel constructions, combinations and arrangements of parts as will be hereinafter fully described and claimed.

In the drawings:—Figure 1 is a view of the preferred form of culler shown in side elevation. Fig. 2 is a top plan view of the preferred embodiment of the culler. Fig. 3 is a vertical sectional view as on line 3—3 of Fig. 2. Fig. 4 is an end view of the culler as on arrow 4 of Figs. 1, 2 and 3. Fig. 5 is a vertical, sectional view of the improved culler as on line 5—5 of Figs. 1 and 3. Fig. 6 is a vertical, transverse, sectional view as on line 6—6 of Figs. 1 and 3.

Like characters of reference designate corresponding parts throughout the several views.

As a support for the mechanism a frame 20 is employed carried upon any approved form of base as the legs 21, the end pieces of the frame 20 being bowed upwardly as indicated at 22 in Figs. 4 and 5, and forming bearings for a shaft 23 disposed substantially horizontally and rotated in any approved manner as by a belt or band pulley 24. Mounted rigidly upon and rotating with the shaft 23 is a frusto-conical screen 25 extending somewhat less than half the length of the shaft 23 and with its larger or lower end disposed to discharge material outwardly over the end of the machine. Surrounding the screen 25 is a frusto-conical drum 26 similarly inclined but with its larger or lower end disposed over a trough 27 into which seed discharged through the orifices of the screen 25 into the drum 26 is discharged. At its smaller end the drum 26 is provided with a funnel 28 having both ends open and the smaller end in position to receive seed from a spout 29 at the bottom of a hopper 30 supported upon the frame 20 by saddles 31, and through which the shaft 23 extends. The hopper 30 is preferably located substantially midway of the frame 20 and a sleeve 32 is mounted within such hopper rotatably movable upon and embracing the shaft 23 and provided with a feed worm 33 adapted to discharge material from the hopper 30 through the trough 29 into the funnel 28 from which it is discharged into the screen 25.

Below the frame 20 a plurality of rotating screens 47 are journaled upon shafts 48 disposed in an inclined position having their upper ends journaled in the frame piece 49 vertically movable upon guide rods 50 and controlled by a screw-threaded rod 51 and threaded hand wheel 52 whereby the elevation of such upper ends may be varied. From the trough 27 spouts 53 are arranged to discharge material into the screens 47 and means for discharging it alternately into the screens 47 is provided in the pusher 54 slidably mounted within the trough 27 and controlled by means of a pitman 55 driven from a crank wheel 56 carried upon one of the shafts 48. It will thus be seen that as the shaft 48 rotates the pusher 54 is moved longitudinally of the trough 27 to alternately cover and uncover the openings leading to the spout 53 and by reason of its pyramidal formation to direct material discharged into the trough 27 alternately through the spouts 53 into the screens 47.

The screens 47 and their shafts 48 are driven in any approved manner as by a band or belt 57 running from a pulley 58 upon the shaft 23 to a double pulley 59 rigid with one of the shafts 48. The other shaft 48 and its screen 47 is driven from the driven shaft 48 by means of a belt or band 60 embracing the pulley 59 and also a similar pulley 61 upon the other of the shafts 48.

It will thus be seen that as the shaft 23 is rotated by reason of the bands 57 and 60 the screens 47 are rotated and receiving material from the trough 27 as described operates upon the material contained therein.

At their lower ends the screens 47 discharge material into a hopper 62 which falling downwardly passes in front of an opening 63 through which an air blast is projected from a fan 64 contained in the fan housing 65. The fan 64 is mounted upon a shaft 166 provided with a pulley 167 driven by a band 168 from a large pulley 169 carried upon and rotated with the shaft 23. Material not blown outwardly through the opening 63 by the fan 64 drops down into a spout 66 from whence it is finally discharged.

The holes or openings in the screen 25 are of such dimension as to permit all cotton seed to pass therethrough but to prevent the passage of sticks, stones and the like which are larger than the seed which said sticks and stones are discharged from the large end of the screen 25 while the seeds passing through such screen are discharged by the drum 26 into the trough 27. From the trough 27 the seed thus discharged is intermittently fed into the screens 47 the openings in which are of such dimension as to prevent mature seed passing therethrough but to permit the passage of small dirt, small stones and immature seeds. Some of the seed of full size but immature and, therefore, light, will be passed the length of the screens 47 and finally discharged into the hopper 62 where passing in front of the air blast they will be blown out and discharged through the opening 63 so that only the mature and good seeds finally reach and are discharged from the spout 66.

What we claim is:—

1. In a cotton seed culler, a screen mounted to rotate, means to feed material into the screen, other screens mounted to rotate adjacent the first-mentioned screen and disposed at an inclination, and means to receive material passed through the first-mentioned screen and conduct it alternately into the last-mentioned screens.

2. In a cotton seed culler, a screen mounted to rotate, means to feed material into the screen, a pair of screens mounted adjacent the first-mentioned screen, and means to conduct material passing through the first-mentioned screen alternately into the second-mentioned screens.

3. The combination with a rotarily mounted screen, of means to feed material into such screens, other screens mounted to rotate in position to receive material from the first-mentioned screen, and means to discharge material from the first screen in series alternately to the next screens.

In testimony whereof we affix our signatures in presence of two witnesses.

BYRON BOWERS.
OLIVER H. FRANKLIN.

Witnesses:
 I. M. STORR,
 FRANK DURDIN.

---

Copies of this patent may be obtained for five cents each, by addressing the "Commissioner of Patents, Washington, D. C."